(No Model.)
H. ROESKE.
APPARATUS FOR PURIFYING WATER.
No. 407,250. Patented July 16, 1889.
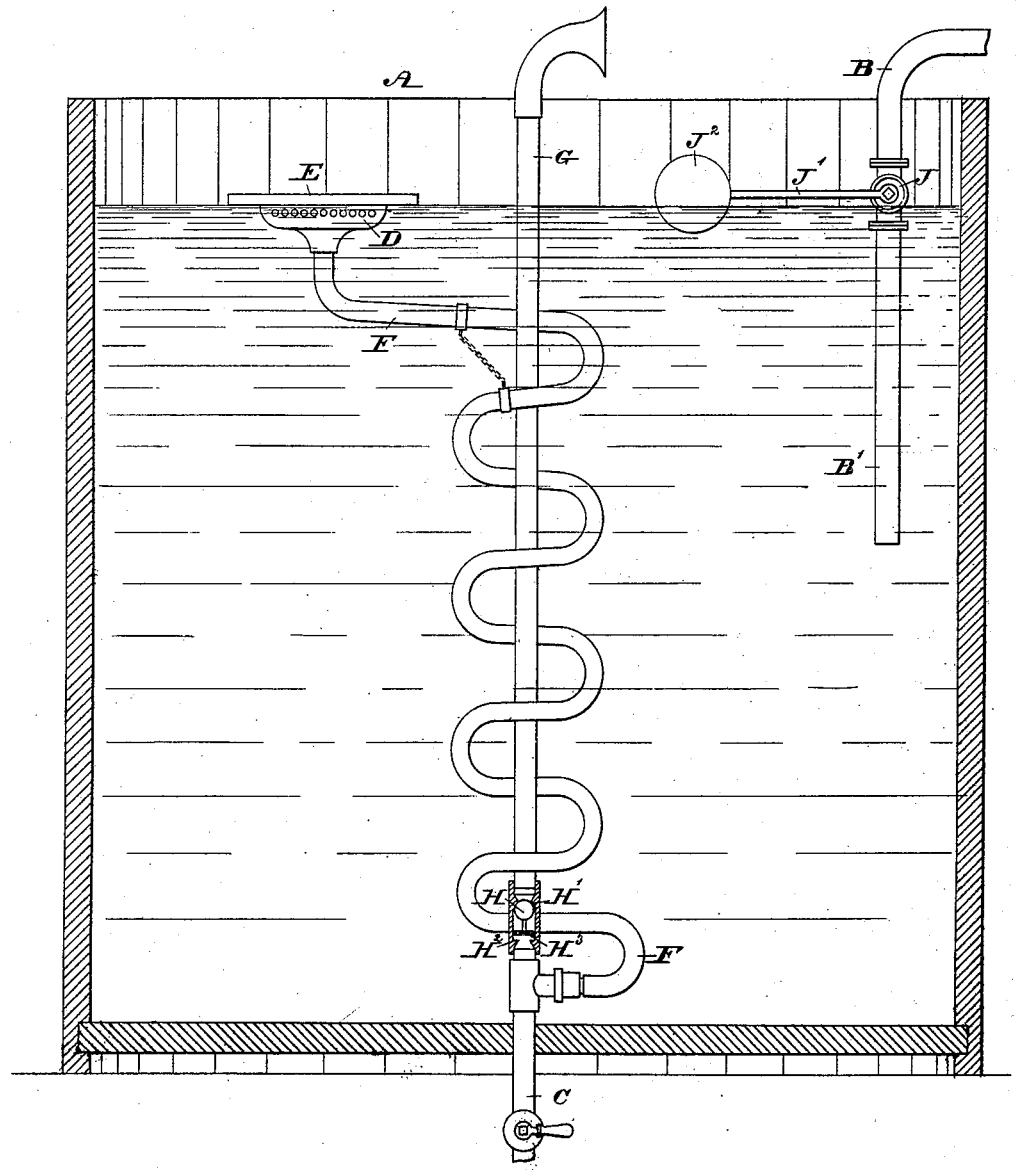
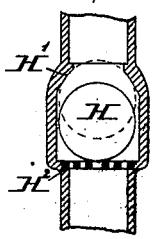
WITNESSES:
Th. Rolle.
A. P. Grant.
INVENTOR:
Henry Roeske
BY John A. Wiederschein
ATTORNEY.

UNITED STATES PATENT OFFICE.

HENRY ROESKE, OF PHILADELPHIA, PENNSYLVANIA.

APPARATUS FOR PURIFYING WATER.

SPECIFICATION forming part of Letters Patent No. 407,250, dated July 16, 1889.

Application filed January 20, 1887. Renewed June 15, 1889. Serial No. 314,340. (No model.)

*To all whom it may concern:*

Be it known that I, HENRY ROESKE, a citizen of the United States, residing in the city and county of Philadelphia, State of Pennsylvania, have invented a new and useful Improvement in Apparatus for Supplying Clear Water and other Fluid and Aerating the Same, which improvement is fully set forth in the following specification and accompanying drawings, in which—

Figure 1 represents a vertical section of an apparatus for supplying clear fluid and aerating the same embodying my invention. Fig. 2 represents a modification of the check-valve thereof.

Similar letters of reference indicate corresponding parts in the two figures.

The objects of my invention are, first, the supply of clear water to a place of service, and, next, the aeration of water.

Referring to the drawings, A represents a water-tank, which is of usual construction.

B represents the induction or supply pipe, and C the eduction or discharge pipe, both suitably connected with said tank.

D represents a perforated head or strainer, which is connected with a float E, or made of buoyant material, so as to occupy a position at the top of the water within the tank, the perforations of said head or strainer being below the top thereof.

To the strainer D is attached a tube F, the lower end whereof is secured to the discharge-pipe C, said tube F being in communication with said strainer and discharge-pipe.

G represents a suction or air pipe, which is secured to the pipe C, and passes upwardly through the tank above the level of the water, and is open at the top to the atmosphere. Within said pipe G is a check-valve H, which has two seats H' H². The under side of the valve carries a perforated foot H³, which is adapted to rest on the seat H²; or, in lieu thereof, said seat H² may be perforated, in which case said base may be dispensed with, as in Fig. 2. The supply-pipe B continues downwardly into the tank, as at B', so as to have its lower end considerably below the level of the water, and is provided with an automatically closing and opening valve J, the plug whereof has connected with it an arm J', which carries a float J², whereby said plug is operated by the rise and fall of water in the tank. The tube F is flexible, whereby its upper end follows the floating strainer D in its rising and falling motions; and it is made extensible or coiled, whereby it possesses sufficient length for the purposes for which it is intended, and is adjustable to the depth of the tank or location of the pipe C.

The operation is as follows: The tank is supplied with water through the pipe B, the parts assuming the position shown in Fig. 1, the cock of the discharge-pipe C being closed, and the check-valve H occupying its seat H', whereby it is closed, this being occasioned by the upward pressure of water from the pipe C, it being noticed that water from the tank reaches said pipes C through the strainer D and pipe F. As the water in the tank is at rest, foreign matters settle or are deposited at the bottom thereof, leaving clear water at the top. Now when the cock of the pipe C is opened the clear water enters the strainer D, flows into the tube F, and reaches the pipe C, by which latter it is directed to the place of service. As the water enters the pipe C it creates a vacuum in the pipe G below the valve H, whereby the latter leaves its seat H', and is thereby opened, the valve then resting on the seat H². Owing to said vacuum, air is now drawn through the pipe C and directed to the water flowing through the discharge-pipe C, whereby said water is aerated, in which freshened and improved condition it is conducted to the place of service. As the water falls in the tank the float J² lowers, and causes the valve J to open, whereby fresh water is supplied to the tank below the level of the water therein, so as not to disturb the clear water at the top. When the cock of the discharge-pipe is closed, fresh water continues to enter the tank until the proper level is attained, the float J² then causing the valve J to close, whereby the supply ceases.

Having thus described my invention, what I claim as new, and desire to secure by Letters Patent, is—

1. A tank for aerating water, having the supply-pipe B, the float E, with strainer D secured thereto, the discharge-pipe C, the flexible pipe F, connected to said strainer and to the discharge-pipe, and the tube G, having its upper end open to the atmosphere and its lower end connected with the discharge-pipe, all of said parts combined substantially as and for the purpose set forth.

2. A tank having a supply-pipe and a discharge-pipe, the latter passing within the tank, an air-tube connected at its lower end to the discharge-pipe within the tube, and a strainer with a flexible tube, the latter connected to the discharge-pipe below the connection of the air-tube and within the tank, substantially as described.

3. The tank A, in combination with the supply-pipe B, the discharge-pipe C, the floating strainer D, the flexible pipe F, connecting said strainer with said discharge-pipe, and the tube G, open at its upper end to the atmosphere, and at its lower end connected to the discharge-pipe above the connection of the pipe F, and provided with the automatic valve H, all substantially as described.

4. The tank A, with automatic supply-pipe B, having its lower end below the water-level, the floating strainer D, with flexible pipe F, the discharge-pipe C, with cock, and the air-tube G, leading into said discharge-pipe and provided with perforated automatic valve H, all substantially as and for the purpose set forth.

HENRY ROESKE.

Witnesses:
JOHN A. WIEDERSHEIM,
A. P. GRANT.